3,182,192
METHOD OF DETERMINING DISTRIBUTION OF FRACTIONS OF A MATERIAL BY RADIOACTIVE MEANS
Alfred R. Vander Ploeg, Port Arthur, Tex., assignor to Texaco Inc., a corporation of Delaware
Filed July 2, 1956, Ser. No. 595,481
1 Claim. (Cl. 250—43.5)

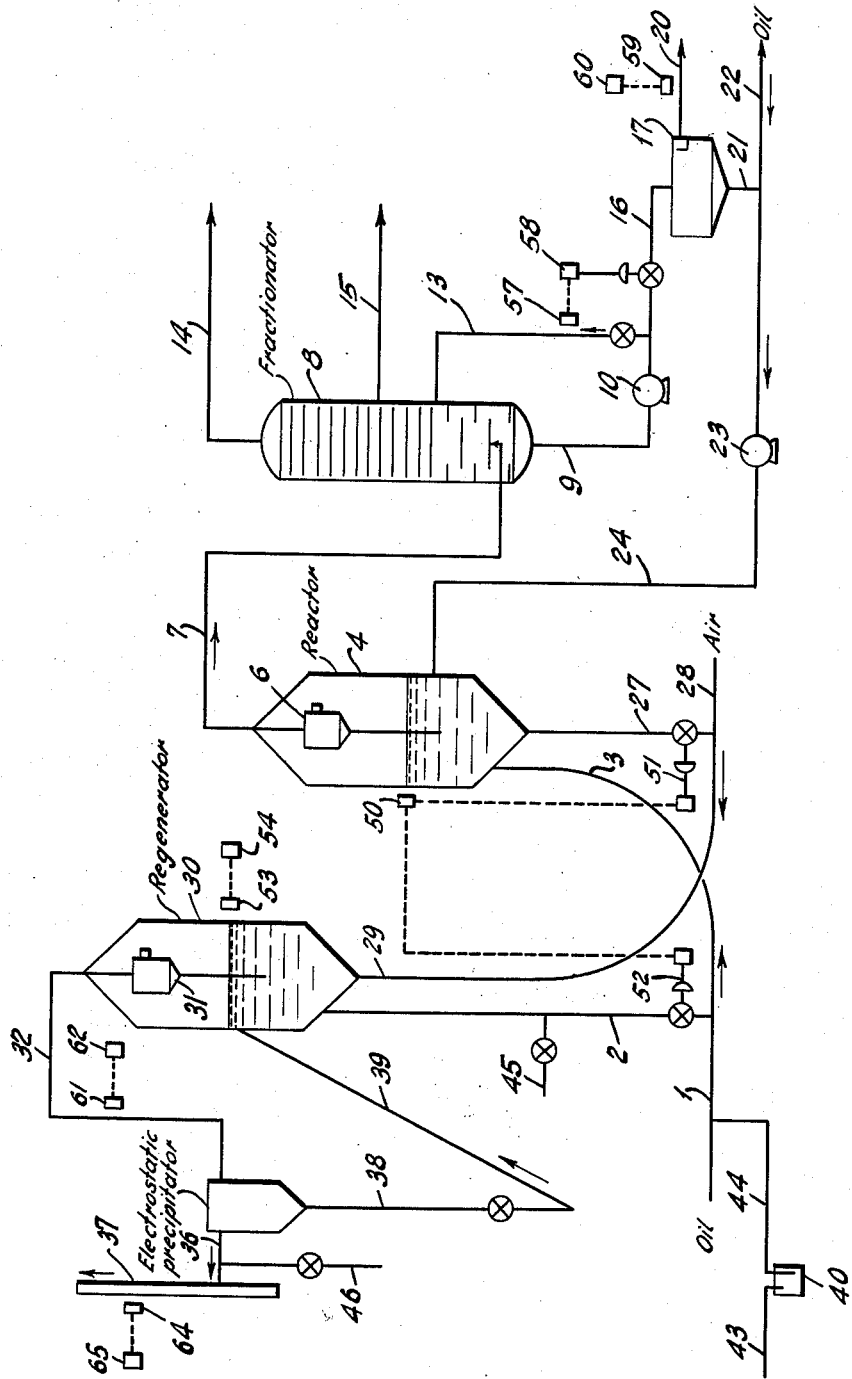

This invention is directed to a method of determining the concentration of a component of a fluid system at a preselected point in the system. This method permits determining the distribution of a component of a fluid system among a plurality of zones through which the component is transported.

This invention is applicable to fluid systems generally and is particularly useful in liquid systems and in fluidized solids systems. The term "fluidized solid" is used in its broadest sense to include substantially complete entrainment of solid particles in fluid as well as agitation of solid particles by means of a stream of fluid passing therethrough with only minor entrainment.

In accordance with this invention, a fluid component of the system is rendered uniformly radioactive, a fraction containing said component is subsequently separated from the remainder, and the radioactivity of the separated fraction is determined.

In one specific application of this process, for example, the distribution of fresh make-up catalyst in a fluid catalytic cracking system is determined as described hereinafter.

The fluidized solids technique is based upon the behavior of a stream comprising solid particles suspended in a fluid, either a liquid or gas. Such a suspension exhibits many of the properties of a liquid. For example, solids may be transported by suspension in a moving fluid in much the same manner as a gas or liquid. A bed of fluidized solids may exhibit a dense phase mass having the appearance of a boiling liquid with an interface between the dense phase comprising ebullient solids in suspension, and fluidizing medium substantially free of solids. The use of the fluidized solids technique to effect solids transport and utilization has been highly developed and is widely used in the fluid catalytic cracking of hydrocarbon oils.

The process of this invention is described herein in detail as applied to fluid catalytic cracking but it will be obvious to one skilled in the art that the process of this invention may be applied in fluid systems generally.

Many catalyst flow problems encountered in fluid cracking are peculiar to a given plant unit and cannot be studied satisfactorily on pilot units. Heretofore, there has been no direct method of studying these problems; consequently, it has been necessary to resort to indirect methods or to rely on estimates.

One of the problems has been to determine the rate of mixing of fresh catalyst with catalyst in the system and the rate of loss of fresh catalyst from the system. A primary obstacle to measuring fresh catalyst mixing and loss rates has been the relative impossibility of distinguishing fresh catalyst added to the system from the catalyst already present therein once the two have mixed. I have found that the catalyst added to a fluid system may be distinguished from the great bulk of catalyst in the system by tagging an aliquot of fresh make-up catalyst with a radioactive label. If only a portion of the fresh catalyst, or a solid having the same physical properties as the catalyst, is tagged, the tagged solid must possess identical qualities with regard to flow characteristics and attrition characteristics as untagged fresh catalyst. Uniformity of distribution of the radioactive label is important since otherwise attrition of the tagged catalyst might result in the production of fines having a different level of radioactivity from the bulk of the tagged catalyst.

It has been found that a uniform distribution of radioactivity in a silica-alumina cracking catalyst can be achieved by impregnation of a silica-alumina catalyst with a solution of cobalt-60 nitrate followed by heating of the impregnated catalyst to drive off the moisture and decompose the nitrate to the oxide. Using the radioactive catalyst described above, it is possible to study problems of catalyst mixing, flow, losses, and attrition in an operating fluid cracking unit without interference with its normal operation. By injecting a tagged catalyst containing about 50 millicuries of radioactive cobalt into a fluid cracking unit containing about 550 tons of catalyst, sufficient tagged catalyst is injected so that the radioactivity level of the circulating streams may be readily determined and yet the radioactivity level is low enough so that no radiological hazard is created.

A radioactive catalyst may be employed advantageously in the process of this invention in the control of fluid catalyst cracking equipment. For example, a radioactive tagged fluid catalyst may be added continuously or from time to time to maintain the catalyst in the system at an equilibrium radioactive level. For example, the level of catalyst in catalyst containing vessels may then be readily determined by means of radiation detectors located immediately above and below the normal bed level. Said radiation detectors may be employed to actuate control means admitting or withdrawing catalyst from said vessels to control the level of catalyst therein. Similarly, catalyst-containing oil streams may be continuously monitored by radiation detection to determine the radioactivity level and catalyst content of said streams. These radiation detectors may be employed to actuate control means to regulate the rate of withdrawal of catalyst-containing oil and thereby effect control of the catalyst content of said catalyst-containing oil. Catalyst losses may also be continuously determined by monitoring streams discharged from the cracking unit for radioactivity. It will be evident from the above that the radioactivity of a fluid stream containing radioactive particles may be detected and a process variably controlled in response to variations in radioactivity of said stream to maintain the solid concentration as indicated by radioactivity at the point of detection at the desired level.

The radioactive content of solid particles suitable for carrying out the process of this invention may be varied greatly depending upon the type system in which the solid particles are used. For example, where a radioactive solid is added to a large mass of non-radioactive solid, relatively high concentrations of the radioactive element are generally necessary. In general, the amount of radioactive material necessary for satisfactory results increases as the density of the unreactive solid increases. For example, more radioactive material is generally required with iron than with silica. When great dilution is encountered, for example, when adding about one pound of tagged silica-alumina cracking catalyst to a system containing upwards of 500 tons of catalyst, a tagged catalyst containing about 30 to 250 microcuries per gram of dry catalyst may be employed. Where a uniformly radioactive solid is employed without dilution, lower radioactive levels may be desired, in the case of the cracking catalyst, for example, the radioactivity may be in the range of about $8 \times 10^{-6}$ to $60 \times 10^{-6}$ microcuries per gram of solid. Concentrations of radioactivity intermediate the two ranges may be employed depending upon the amount of dilution encountered in a given application.

Several factors must be considered in selecting radioactive materials for use in the process of this invention.

For example, the radioactive material must not vaporize nor be converted to a product which would vaporize at the temperature or in the environment encountered in the system. It is also desirable that the radioactive material be a high energy gamma emitter so that absorption of the radiation by the solid will not seriously decrease counting sensitivity. We have found cobalt-60 to be well adapted for tagging fluid cracking catalyst and we prefer cobalt-60 for this application. However, other radioactive materials, for example, silver-110, antimony-124, scandium-46 and cerium-144, may be employed in the process of this invention. A component may be rendered radioactive by direct irradiation in an atomic reactor.

A typical fluid catalytic cracking unit is shown in the accompanying figure. Oil charge from an external source, not shown, is introduced through transfer line 1, admixed with hot regenerated catalyst from standpipe 2 and passed through reactor riser 3 to reactor 4. The oil feed is cracked in reactor 4 and reaction products are withdrawn through cyclone separator 6 and line 7. Cyclone separator 6 returns a substantial part of the entrained catalyst to the reactor bed, but usually some catalyst is also entrained in the reaction products. Hot reaction products and entrained catalyst pass through line 7 to fractionator 8. In fractionator 8 the incoming hot reaction products are cooled and freed of entertained catalyst by counter-current contacting with a stream of slurry oil comprising catalyst suspended in heavy oil. Slurry oil is withdrawn from fractionator 8 through bottoms line 9 and is recirculated to the fractionator by pump 10 through line 13. The cracked products are fractionated in fractionator 8 to produce gasoline and lighter fractions as an overhead product withdrawn through line 14 and gas oil withdrawn through line 15. A part of the slurry oil is withdrawn through line 16 and discharged to separator 17 where entertained catalyst is separated from the slurry oil. Separated oil is withdrawn through line 20 to external storage not shown. Separated catalyst or oil of increased catalyst content is withdrawn from separator 17 through line 21 and is transferred by a stream of oil in line 22, transfer pump 23 and line 24 back to the reactor 4.

Catalyst from the dense phase of reactor 4 is withdrawn through standpipe 27 and transferred in an air stream from line 28 through regenerator riser 29 to regenerator 30. Coke deposited on the catalyst in the reactor is burned off the catalyst in the regenerator. Flue gas from regenerator 30 is discharged through cyclone separator 31 and line 32 to electrostatic precipitator 33. Electrostatic precipitator 33 is employed to separate the bulk of catalyst entrained in the flue gas which is not returned to the regenerator bed by cyclone separator 31. Although the separation obtained in electrostatic precipitator 33 is nearly complete, a small amount of fine catalyst remains entrained in the flue gases, passes through line 36, and is discharged to the atmosphere through stack 37. Catalyst separated in precipitator 33 is returned to the regenerator by way of standpipe 38 and line 39.

Radioactive catalyst in bomb 40 is displaced with nitrogen from line 43 and injected into oil feed line 1 through line 44. Catalyst samples may be withdrawn from the circulating catalyst stream where desired. For example, catalyst representative of that circulated within the cracking unit may be withdrawn from standpipe 2 through sample line 45. Catalyst representative of that lost from the unit to the atmosphere may be obtained by withdrawing a sample of gas passing from the precipitator to the stacks in line 36 through sample line 46 and filtering the gas so withdrawn to separate entrained catalyst.

The use of radioactive catalyst to determine or control process variables in fluid catalyst cracking is also illustrated in the figure. A radiation detector 50 is positioned adjacent the reactor at a point corresponding to the desired bed level. Detector 50 actuates valve 51 which controls withdrawal of catalyst from reactor 4 through standpipe 27. The catalyst bed level in reactor 4 is controlled at the desired point by employing detector 50 to actuate control valve 51 to tend to open and thus increase the rate of catalyst withdrawal when catalyst reaches the level of detector 50 and to tend to close and thus decrease the rate of catalyst withdrawal when the catalyst is below detector 50. In the alternative, reactor bed level may be controlled by actuating valve 52 which admits catalyst to the reactor through riser 3. In this case, when catalyst level in reactor 4 reaches detector 50, control valve 52 is urged to close to reduce the rate of catalyst addition and when the catalyst level reaches the detector, valve 52 is urged to open. The use of a detector to indicate bed level in the regenerator is shown using detector 53 and indicator 54, which may be moved adjacent the regenerator. The bed level is determined by observing the point at which the radiation intensity shown by indicator 54 decreases.

Heretofore, there has been no satisfactory method of continuously determining the catalyst content of the slurry oil circulated to the fractionator. It has usually been the practice to withdraw samples of the slurry oil and determine the solids content by laboratory tests. This procedure, of course, introduces a delay of hours or days between the time when a sample is taken and when the catalyst content is known and so close control is impossible. However, when employing a radioactive tagged catalyst, the catalyst content of catalyst-containing streams may be continuously monitored by radiation detectors to determine the radioactivity level and from this the catalyst content. Detector 57 is employed to monitor the slurry oil stream in line 13. When the radioactivity level equivalent to a catalyst concentration in excess of that desired is detected, detector 57 actuates control valve 58 to urge open valve 58 and withdraw slurry oil to separator 17. When the catalyst content of the slurry in line 13 falls below the desired level, detector 57 actuates valve 58 to urge it closed.

Similarly, detectors may be employed to monitor streams leaving the unit to determine the catalyst contents of these streams. For example, detector 59 and indicator 60 may be employed to continuously indicate the amount of catalyst contained in the separated oil. Detector 61 and indicator 62 may be employed to measure the catalyst concentration in the flue gas passing from regenerator 30 to electrostatic precipitator 33. Detector 64 and indicator 65 may be employed to measure the catalyst concentration in the flue gas passing from the electrostatic precipitator to the atmosphere through line 37. Obviously, the measurements of the catalyst content of the flue gas passing to the precipitator, and the measurement of the catalyst content of the gas passing from the precipitator, may be employed to determine the distribution of catalyst passing to the precipitator between the stream passing to the atmosphere and the stream of separated fines returned to the regenerator through lines 38 and 39.

The invention will be described in more detail with reference to the following example. A radioactive catalyst is prepared by the following process:

About 350 grams of a synthetic silica-alumina fluid cracking catalyst in the form of microspheres ranging from less than 1 micron in diameter to more than 80 microns with an average particle size of about 40 microns is weighed into a bomb. The catalyst, as weighed, contains about 15% adsorbed moisture and therefore amounts to about 300 grams on a dry basis. A solution of cobalt nitrate is prepared by dissolving 53 grams of $$Co(NO_3)-2.6H_2O$$

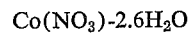

in 500 milliliters of water. Fifty millicuries of cobalt-60 in the form of a solution of cobalt-60 nitrate is diluted with the aforesaid cobalt nitrate solution to form 100 milliliters of solution. This solution comprising 50 millicuries of cobalt-60 in a cobalt nitrate solution is then added to the silica-alumina catalyst and mixed by stirring until an appearance of homogeneity is obtained. The impregnated catalyst is then heated to a temperature of about 700 to 770° F. and held at this temperature for about 10 hours. The catalyst is then cooled and is ready for use. This catalyst comprises about 167 microcuries of cobalt-60 per gram of dry cracking catalyst impregnated.

A study of flow characteristics in a fluid catalytic cracking unit is made by injecting about 350 grams of radioactive catalyst containing 167 microcuries of cobalt-60 per gram basis dry catalyst (a total of 50 millicuries of cobalt-60) into a fluid catalyst cracking unit containing about 550 tons of catalyst. Variations in the radioactivity content of the circulating catalyst within the unit and the catalyst lost to the atmosphere through the flue gas stacks are determined by sampling these streams and counting the radioactivity of the catalyst samples. Circulating catalyst is advantageously sampled from the regenerator standpipe. The catalyst leaving the stacks may be sampled by filtering a portion of the flue gas to separate entrained catalyst. The catalyst samples are counted for gamma activity with a high sensitivity radiation detector. Results are expressed as specific activity in counts per minute per gram of catalyst. The radioactivity level of any sample is a direct measure of the amount of tagged catalyst in that sample. The concentration of tagged catalyst may be determined by comparing the specific activity of a given sample with the specific activity of a standard catalyst containing a known amount of radioactivity. A sample of equilibrium unit catalyst after injection of radioactive catalyst has a specific activity of 11.4 counts per minute per gram. The average specific activity of samples of catalyst passing to the flue gas stacks during the first 22 hours after injection of the radioactive catalyst is 16.5. From these data the loss of fresh catalyst is calculated to be 144% of the loss of equilibrium catalyst. On the day of this test 7.1 tons of catalyst were lost from the flue gas stacks to the atmosphere. The total amount of cobalt-60 added to the cracking unit was calculated to yield $5.7 \times 10^9$ counts per minute. The loss of activity in 7.1 tons of catalyst having a specific activity of 16.5 amounts to $1.1 \times 10^8$ counts per minute. The loss of freshly added catalyst in the first day then amounts to $$\frac{1.1 \times 10^8}{5.7 \times 10^9}$$

or 1.9%.

Samples of unit catalyst taken at 15 minute intervals show that most of the mixing of the radioactive catalyst occurs within an hour after the radioactive catalyst is added.

Radioactive tagged catalyst may also be employed to determine catalyst decrepitation rate. For example, it may be desirable to determine the decrepitation rate of a particular catalyst in admixture with another catalyst where several catalysts are mixed in a fluidized system. One catalyst may exert an effect on the decrepitation rate of the other. It is undesirable to add a catalyst to an operating unit if inordinately high decrepitation or attrition of the added catalyst would result upon mixing. The relative attrition or decrepitation of a given catalyst in a mixture may be determined by rendering one of the components of the mixture radioactive, subjecting the mixture to attrition, and determining the distribution of the added component among the products of attrition. Where a component of the circulating catalyst in a fluid cracking unit is rendered radioactive, the decrepitation of the catalyst may be determined from time to time to follow the decrepitation of that component in the cracking unit.

It may also be desirable to study the decrepitation rate of several catalysts or solids simultaneously. This may be done either in commercial equipment during normal operation or in laboratory equipment by rendering each component radioactive with material emitting gamma radiation of different energies. The distribution of components of a given fraction may then be determined by a detector responsive to radiation energy from all the gamma emitters. An instrument known as a Pulse Height Analyzer is capable of differentiating between radiation energies of different levels and may be used to determine the distribution of each component in a fraction.

A radioactive catalyst may be employed to determine areas in a fluid catalytic cracking unit in which there is no circulation of catalyst. This may be done by injecting radioactive catalyst into a unit containing catalyst and subsequently, after allowing time for the catalyst mixture to reach equilibrium, the fluid cracking system is surveyed to determine sections of the unit showing little or no radioactivity. These sections indicate that catalyst is lying dormant therein.

Although the present invention has been described in detail as applied to a fluid catalytic cracking unit, it is to be understood that the invention may be applied to other fluid systems in an analogous manner.

Although the catalysts in the above-described examples are porous solids, the present invention may be employed in the study of the distribution of non-porous solids as well. Where the solids are non-porous, the impregnation technique described above does not provide a uniformly radioactive solid particle. It is preferable, therefore, to employ other methods of preparation of radioactive non-porous solids. A non-porous solid may be made uniformly radioactive by various known techniques, for example by radiation in a neutronic reactor or pile.

The present invention may also be employed in a fluid system in which the distribution of a liquid component is to be determined. For example, in a distillation system, a component of the feed stock may be rendered uniformly radioactive and the radioactivity of a fraction of the liquid subsequently determined. As a specific example, the radioactivity of a product stream may be detected and the distribution of radioactive components of the feed in the product stream determined in a manner analogous to the above described method of determining the distribution of fresh catalyst in the catalytic cracking system. A part of the feed stock, preferably an aliquot, is preferably rendered uniformly radioactive by a suitable technique, for example by irradiation; alternatively, a synthetic feed stock of uniform radioactivity may be prepared and admixed with the non-radioactive feed stock to produce a uniformly radioactive composite feed stock with uniform properties. The distribution of the added radioactive component in the liquid, or a selected fraction thereof, at any selected point in the system may then be determined and, if desired, employed as a control parameter. Similarly, by detecting the radioactivity of a sample or of a stream, for example a fractionator product stream, the distribution of radioactive material may be determined in a manner exactly analogous to the methods hereinabove described for making similar determinations in the case of the fluid bed catalytic reactor systems of the examples.

Obviously many modifications and variations of the invention as hereinbefore set forth may be made without departing from the spirit and scope thereof and only such limitations should be imposed as are indicated in the appended claim.

I claim:

The method of determining the quantity of catalyst present in the product of a catalytic reaction which comprises adding a predetermined amount of a radioactive tracer material to a batch of catalyst to be contacted with the feed to be converted in said catalytic reaction, said tracer corresponding to at least one ingredient of said catalyst, catalytically converting said feed with said catalyst, substantially separating said catalyst from the effluent from said catalytic reaction and producing a signal representative of the radioactivity of the substantially catalyst-free effluent from the catalytic process.

References Cited by the Examiner

UNITED STATES PATENTS 2,674,363 4/54 Graham _____ 250—43.5
2,734,136 2/56 Atchison _____ 250—43.5

OTHER REFERENCES

"Atomic Energy Applied to Measurements of Catalyst Level in Cracking Units," by D. P. Thornton, Jr. from Petroleum Processing, September 1950, pp. 941–945.

"Using Tracers in Refinery Control," by D. E. Hull, from Nucleonics, vol. 13, No. 4, April 1955, pp. 18–21.

"Tracers Locate Entrainment," by Wagner et al., from Nucleonics, April 1956, vol. 14, No. 4, pp. 78–83, 128.

RALPH G. NILSON, *Primary Examiner.*

IRVING L. SRAGOW, *Examiner.*